A. HERZ.
RECORDING ELECTRIC METER.
APPLICATION FILED AUG. 15, 1911.
1,156,226.
Patented Oct. 12, 1915.
2 SHEETS—SHEET 1.
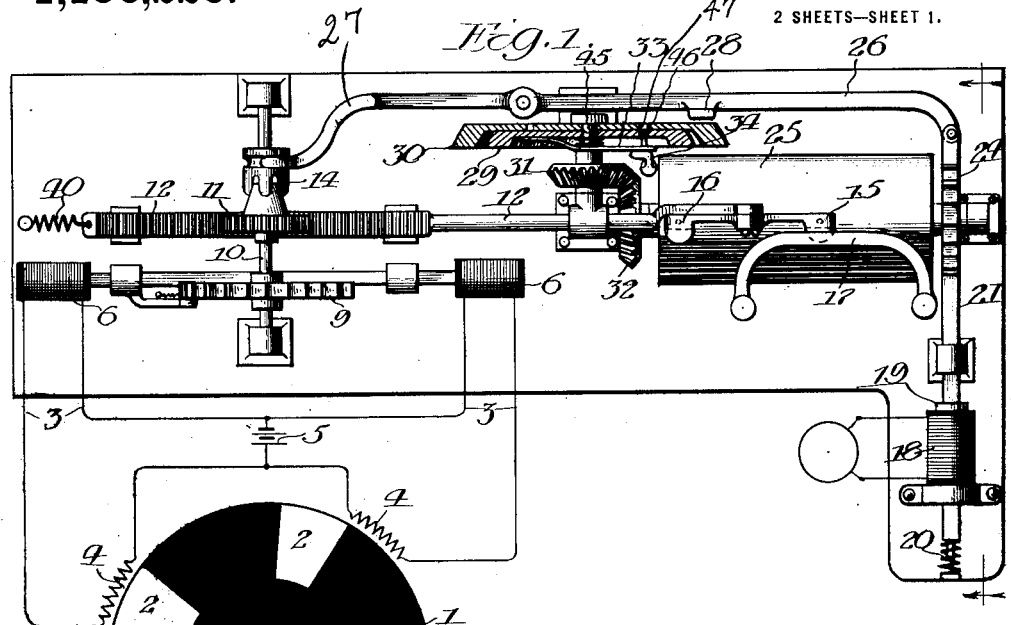
Fig. 1.
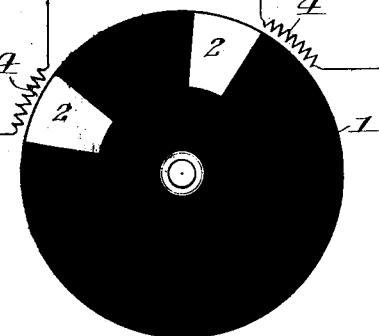
Fig. 4.
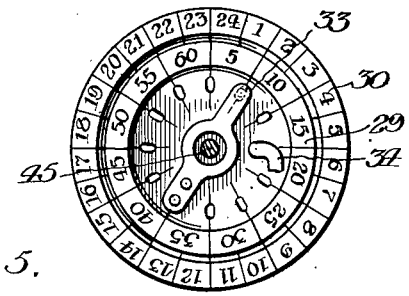
Fig. 5.
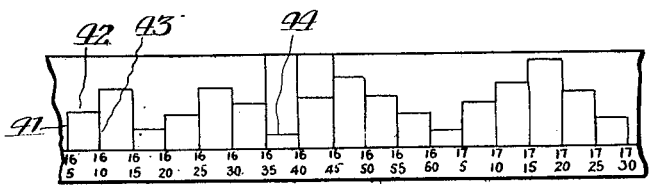
Witnesses
C. M. Kennick
A. S. Dennison
Inventor
Alfred Herz
by A. Miller & Belfield
Atty.

UNITED STATES PATENT OFFICE.

ALFRED HERZ, OF CHICAGO, ILLINOIS. REISSUED

RECORDING ELECTRIC METER.

1,156,226.  Specification of Letters Patent.  Patented Oct. 12, 1915.

Application filed August 15, 1911.  Serial No. 644,240.

*To all whom it may concern:*

Be it known that I, ALFRED HERZ, a citizen of the United States, residing at Chicago, in the county of Cook and State of Illinois, have invented a certain new and useful Improvement in Recording Electric Meters, of which the following is a full, clear, concise, and exact description, reference being had to the accompanying drawings, forming a part of this specification.

My invention relates to an improved recording device for meters, and is particularly adapted for use in connection with electric meters.

An object of my invention is to perfect a recording device, or attachment for use with electric meters by means of which the period of maximum demand can be readily determined.

A further object is to make a record of meter readings in which the indications are in the form of successive steps or angular blocks.

A further object is to make a recording mechanism for making records on a movable tape by which the reading recorded may be greater than the width of the tape.

A further object of my invention is to provide means for recording the number of revolutions of a disk without subjecting the same to any friction or external load.

A further object of my invention is to control the action of meter recording devices by the effect of light upon selenium cells, or other variable resistance elements.

Other objects will be apparent to those skilled in the art in the particular arrangements and combinations of parts hereinafter described.

Figure 2:
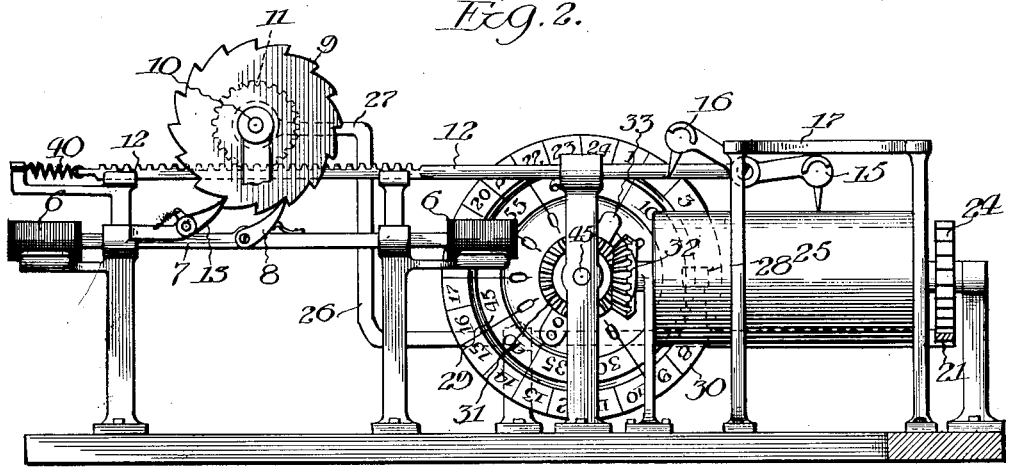
Figure 3:
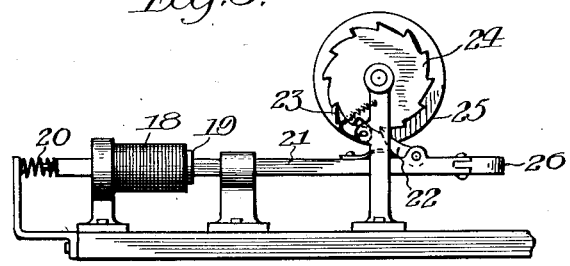

In the accompanying drawings, which are a part of this specification, Figure 1 shows a plan view of the apparatus; Fig. 2 is a front elevational view of Fig. 1; Fig. 3 is a side view of Fig. 1 looking in the direction of the arrows; Fig. 4 is a detail view of the type recording disks: and Fig. 5 is a detail of the record tape showing the form of record and the time stamped thereon.

Throughout the various views the same element is indicated by the same reference numeral.

Referring more particularly to the drawings, 1 is a revolving disk which may be carried by a shaft of any meter the revolutions of which it is desired to record. This may be part of an ordinary watt hour meter, or be driven from the mechanism of a gas or water meter. As shown, the body of the disk is colored black, with the exception of white spaces marked 2—2. In use a light is arranged to shine on the face of the disk. It will be obvious that only unblackened portions will reflect the light.

4—4 indicate selenium cells which possess the known property of reducing their electrical resistance when under the influence of light. Consequently when the unblackened portions of the disk come opposite the cells 4—4 the resistance of these cells will be reduced. It is evident, however, that other ways of periodically throwing light upon the cells to be affected may be adopted, such for instance as placing the cells on the opposite side of the disk from the source of light and cutting away openings to permit the light to pass through. Other relative arrangements of the light and the disk, or other means of periodically casting the light on the cells to be affected may be adopted.

The cells or other variable resistance elements 4—4 are a part of two parallel circuits 3—3, having a common source of energy as 5. Each circuit 3 also contains a solenoid winding 6. The movable cores of these solenoids are connected by a rod 7 working in suitable bearings as shown. Attached to the rod 7 is a spring pressed pawl 8, engaging with a notched wheel 9. When the light falls on one of the cells 4, its resistance is reduced and current flows through the corresponding solenoid actuating the rod in one direction. The second cell will be affected by the light shortly after the first, and by a corresponding action of the other solenoid, the rod and pawl will be returned to their original positions. By this means the wheel 9 will be turned one notch for each reciprocation of the rod 7, which corresponds to one revolution of the meter disk. The wheel 9 is rigidly attached to a shaft 10, journaled in suitable bearings as shown. The shaft 10 also carries a loose wheel 11 which meshes with suitable teeth carried on a rack bar 12. Carried on the shaft 10 is also a clutch 14 which is adapted to alternately engage and release the wheel 11 for the purpose of operating the bar 12. Attached to one end of the bar 12 is a spring 40 which pulls the bar in a direction opposite to that in which it is moved by the wheel 11. A dog 13 is provided in connection with the wheel 9 to prevent the spring from returning the bar to its zero position, except when the clutch 14 is thrown out of engagement with the wheel 11. It thus appears that the revolutions of the disk 1 alternately reciprocate by electrical means the rod 11 which in turn actuates mechanism for moving the bar 12 in one direction, and that means are provided for returning the bar 12 to its original position.

Attached to the end of bar 12 opposite to the spring are pens 15 and 16 carried on the ends of the bell lever which is pivoted to the bar. Pen 15 is shown in contact with a wheel 25 designed to carry a paper tape. As the bar 12 is notched forward in the manner previously described, pen 15 moves in a straight line parallel to the axis of the wheel or cylinder 25, making a line on the tape as shown at 41 in Fig. 5. Since the range of movement transverse to the tape is evidently limited, it is desired to return the pen to the zero position at the end of a predetermined interval. This result is accomplished by releasing the clutch 14 so that the wheel 11 may slip on the shaft 10, whereupon the spring 40 draws the bar and its associated pens back to their original positions. The means for releasing the clutch are controlled by a clock circuit in which is the solenoid winding 18. Associated with the winding 18 is the plunger 19 bearing on which is a spring 20. Opposite the spring 20 the plunger 19 is connected to a rod 21 carried in suitable bearings and pivoted in turn to a lever 26. The last named lever is supported intermediate its ends as shown, and carries at the end opposite 21 the arm 27, which operates the clutch 14 in an obvious manner.

Carried on the shaft 21 is a spring pressed pawl 22 which coöperates with the ratchet wheel 24. A spring pressed ratchet 23 allows the wheel 24 to turn in one direction only. Wheel 24 is carried on the same shaft as the tape wheel 25. When the solenoid winding 18 is energized plunger 19 moves toward the left in Fig. 3 in opposition to the spring 20 and draws the rod 21 with the pawl 22 in the same direction. Consequently the wheel 24 will be moved up one notch and at the same time the tape which moves with wheel 25 will be drawn along causing one of the pens to make a stroke as 42 in Fig. 5. At the end of this movement of rod 21 the levers 26 will be operated sufficiently so as to disengage the clutch 14 from wheel 11, allowing the spring 40 to return the bar 12, and consequently the pens, to the zero position. This last movement causes the pen to make a stroke such as 43 in Fig. 5. The mechanism is now in a position to repeat the cycle just described. In case the reading of the meter during the succeeding period is greater than that of the first one, the line drawn longitudinally of the tape will lie farther from the zero line than in the first case, but when the reading is less the line parallel to the zero line will lie closer to it. But in any case the reading of the meter during any period is proportional to the distance between the zero line and the line drawn parallel thereto at the end of such period.

The cycle of operations just described makes a record in the form of successive blocks or steps as shown in Fig. 5. It will be obvious that the length of step made by the tape will be constant, or nearly so, and that consequently the distance between successive vertical lines or the length of each step in the record will be approximately constant.

In order to enable a larger reading to be recorded with a given width of tape than would otherwise be the case, applicant uses duplicate pens as previously mentioned, and provides means whereby when the first pen has reached the edge of the tape it is lifted and the second pen thrown into engagement with the tape. As shown more plainly in Fig. 2 this is accomplished by mounting the pens one on each side of a pivot on the operating bar and providing a guide as 17 which is supported parallel to the wheel 25, and as the rod moves forward from zero the first pen is thrown by the guide down against the tape. Now the distance between the pens is equal to the width of the record from the zero mark to the edge of the tape, and as the first pen reaches the edge of the tape the second one contacts with the guide and is thrown into position for making a record, at the same time lifting the first pen in the air. In case the second pen is brought into play in this combination the record assumes the form shown at 44 of Fig. 5 where to obtain the true reading the distance between the line and the zero mark must be added to the distance between zero mark and the upper edge of the tape. If desired the pens may be provided with different colored inks or other means may be adopted for distinguishing the mark of one from that of the other. As shown on Fig. 5, the tape has the time stamped along the edge at 5 minute intervals. The particular interval at which the time is recorded is of course a matter of choice, and might be effected by means other than that used for making the record, and the length of the intervals at which the time is stamped might differ from those at which the recording mechanism is actuated. However, I prefer to stamp the time on the tape at the same time at which the recording mechanism is returned to the zero point and make use of much of the same mechanism for this purpose. This time stamping attachment appears in Figs. 1, 2 and 4, and consists of two concentrically mounted type wheels 29 and 30. The face of these wheels is illustrated in Fig. 4. As shown each wheel is slotted from the edge toward the center and its outer rim has a flat printing surface graduated as desired. The lever 26 carries a projection 28 which is designed to make contact with the wheel 30 whenever the lever 26 is operated by the solenoid 18. In this way the section of the wheel 30 and consequently the underlying section of the wheel 29 is thrown into contact with the wheel 25 whenever the clutch 14 is operated, and by means of a typewriter ribbon by similar means not shown the time may be stamped on the edge of the record tape. The slots above mentioned give the individual segments of the wheels sufficient elasticity so that the segments may be thrown into contact with the wheel 25 without disturbing the mounting of the type wheels as a whole.

In the particular embodiment of my invention shown and described the mechanism is designed to record in five minute intervals and the time is stamped at the same time. Consequently the outer wheel is used as an hour wheel and numbered from one to twenty-four, whereas the inner wheel is used as a minute wheel and numbered from five to 60 in five minute intervals. As best shown in Fig. 1 wheel 29 is mounted on a shaft 45 geared to the shaft of the wheel 25. When the wheel 29 is moved forward by the solenoid 18 wheel 29 is revolved by gears 31 and 32 to the extent of one segment. Since there are twenty-four hours in a day the outer wheel 30 should revolve only once in twenty-four hours. To accomplish this wheel 30 is mounted loosely on the shaft 45 but is provided with 24 holes at equal intervals. Carried on the under side of wheel 29 and revolving therewith is a spring plate 33 embracing the shaft 45. Beneath the wheel 29 is a fixed guide or cam 34 with which the spring 33 comes in contact once during each revolution of the wheel 29. Spring 33 carries a point 46 which lies immediately below an aperture 47 in the wheel 29. However when the spring 33 comes in contact with the guide 34 it is thrown into such a position that the point 46 projects through wheel 29 into one of the apertures in the wheel 30 locking the wheels together and causing the latter wheel to move forward the distance of one segment. The distance through which the two wheels are thus locked together obviously depends upon the length of time the guide 34 is in contact with spring 33 and is determined by the shape of the guide 34. This is designed so that wheel 30 shall move forward only one twenty-fourth of a revolution at one time.

The operation of my device is as follows: The revolution of the disk 1 varies the resistance of the circuit 3 so as to reciprocate the rod 7 and in turn rotate the wheel 11. Wheel 11 drives the pen operating bar 12 to make a record on the tape which moves with wheel 25. At the end of a predetermined interval a circuit separate from that of the meter is energized to move forward the tape, making a straight line thereon and approximately at the same time to release the wheel 11, so that the pens may be returned to zero position, and to print the time upon the side of the tape.

It will be understood that wherever light is spoken of in this specification that the non-luminous radiations which follow the laws of light in the way of reflection and refraction are intended to be included. It further will be understood that wherever the word cell is used that any element which may vary its resistance under the action of light or heat is intended to be included.

It is obvious that while the arrangement described herein and shown in the accompanying drawing is the preferred form of my device variations and rearrangements thereof may be made without departing from the spirit of my invention.

Having thus described my invention what I claim is:

1. In a recording meter in combination, a plurality of selenium cells, means for varying the resistance of said cells in definite succession, and means for forming a record governed by the variations in resistance of said cells.

2. In a recording meter in combination, a reciprocable shaft, a lever pivoted to said shaft having a pen on each end, and means for depressing first one end and then the other end of said lever.

3. In a recording meter in combination, an arm, a lever pivoted to said arm having a pen at each end, and means for depressing first one end and then the other end of said lever.

4. In a recording meter in combination, a record receiving blank, a plurality of tracing means for coöperating therewith, and means for engaging said tracing means with said blank one after the other.

5. In a recording meter in combination, a revolving shaft, a reciprocating element, two selenium cells, and means controlled by said cells for producing a complete reciprocation of said element for each revolution of said shaft.

6. In a recording meter in combination, a revolving shaft, a reciprocating element, solenoids for operating said element, cells connected in circuit with said solenoids and means for varying the resistance of said cells.

7. In a recording meter in combination, a rotatable element normally rotating in a given direction, meter mechanism operated in response to the rotations of said element, an electrical device for operating said mechanism, and a selenium cell for governing said device.

8. In a recording meter in combination, a rotatable element normally rotating in a given direction, meter mechanism operated in response to the rotations of said element, a solenoid for operating said mechanism, and a selenium cell for governing said device.

9. In a recording meter in combination, a record receiving blank, duplicate tracing devices for coöperating with said blank, and means for alternately engaging said devices with said blank.

10. In a recording device in combination, a reciprocating element, a solenoid for operating said element, a record blank, a tracing member normally in contact with said blank, and means for advancing said tracing member a fixed distance upon each reciprocation of said element.

11. In a recording meter in combination, a tape, a tracing device, means for advancing said device transversely of said tape, means for moving said tape longitudinally while said device is at its outmost position, and means for returning said device to its original position, said tape moving means being stationary for equal intervals of time intermediate its periods of movement, and the opposite movements of said device being parallel.

12. In a recording device in combination, a tracing member, normally stationary blank holding mechanism having a record blank coöperating therewith, printing means normally out of contact with said blank, and a single device for operating said mechanism and said printing means.

13. In a recording device, a type-wheel of flexible material having radial slots extending from the circumference toward the center.

14. In a recording meter in combination, a rotating element normally rotating in a given direction, electric mechanism for making a record of the rotations of said element, and a selenium cell for controlling the action of said mechanism.

15. In a recording device in combination, a record blank, means for tracing a continuous line on said blank, mechanism for advancing said means in a succession of definite steps, means for moving said blank a definite distance at the end of a definite interval of time, and means for returning said tracing means to its original position after the movement of said blank has been initiated.

16. In a device of the class described in combination, a reciprocating bar, a rotatable shaft driven from said bar, a gear operated by said shaft, a clutch for controlling the operation of said gear by said shaft, a rack driven by said gear, and means for periodically releasing said clutch.

17. In a device of the class described in combination, a reciprocable bar, an oscillating member pivoted to said bar, said member having a pen at each end, and a guide piece for engaging first one end and then the other of said member in order to depress the same.

18. In a device of the class described in combination, a movable record blank, tracing means for making a record on said blank, a reciprocable member for advancing said tracing means, a rotatable element for driving said member, a clutch for controlling said element, a printing device for stamping the time on said blank, and means for simultaneously operating said device and releasing said clutch.

19. A recording meter comprising a tracing member having a definite zero position, means for advancing said member repeatedly in a straight line from its zero position, a normally stationary record blank coöperating with said member, means for moving said blank at definite intervals at right angles to the path of movement of said member, and means for returning said member to zero position in a line parallel to its advance movement immediately after the movement of the blank, said return movement occurring immediately after the movement of said blank and while said blank is stationary.

20. A recording meter comprising a tracing member having a definite zero position, means for advancing said member repeatedly in a straight line from its zero position, a normally stationary record blank coöperating with said member, means for moving said blank at definite intervals at right angles to the path of movement of said member, and means for returning said member to zero position in a line parallel to its advance movement immediately after the movement of the blank, said return movement occurring immediately after the movement of said blank and while said blank is stationary, and said tracing member advancing on a repeat movement along the line of the preceding return movement.

21. In a recording meter in combination, a wheel for moving a record blank, an arm, tracing means carried by said arm, means operating said arm to carry said tracing means over the record blank, a clutch means controlling said operating means, and a single device having connections for moving said wheel and releasing said clutch.

22. The method of operating recording meters which consists in advancing a tracing member in a given direction over a record blank from a zero position in a series of successive steps, moving said blank at fixed intervals only in a direction substantially at right angles to the direction of movement of said tracing member, and returning said tracing member to zero substantially at the time when said blank becomes stationary again.

23. In a recording meter in combination, a record blank, two tracing members for acting upon said blank, a single bar upon which said members are supported, means for moving said bar to carry said members over said blank, and means for throwing said members into contact with said blank one after the other.

24. In a recording meter in combination, a record blank, two tracing members for acting upon said blank, a single bar upon which said members are supported, means for moving said bar to carry said members over said blank, and means for throwing one of said members against said blank on the line made by the other of said members.

In witness whereof, I hereunto subscribe my name this fifth day of August A. D., 1911.

ALFRED HERZ.

Witnesses:
  AUGUSTUS S. DENNISON,
  HAZEL JONES.